Nov. 17, 1970   W. E. EICHELBERGER ETAL   3,541,330
PHOTOCHROMIC GLASS IMAGE STORAGE AND DISPLAY APPARATUS
Filed May 31, 1967                           2 Sheets-Sheet 1

INVENTORS,
WILLIAM E. EICHELBERGER
GERHARD K. MEGLA
BY
William J. Simmons Jr.
ATTORNEY Nov. 17, 1970  W. E. EICHELBERGER ETAL  3,541,330
PHOTOCHROMIC GLASS IMAGE STORAGE AND DISPLAY APPARATUS
Filed May 31, 1967  2 Sheets-Sheet 2

INVENTORS.
WILLIAM E. EICHELBERGER
GERHARD K. MEGLA
BY
William J. Simmons Jr.
ATTORNEY

United States Patent Office 3,541,330
Patented Nov. 17, 1970

3,541,330
PHOTOCHROMIC GLASS IMAGE STORAGE AND DISPLAY APPARATUS
William E. Eichelberger and Gerhard K. Megla, Raleigh, N.C., assignors to Corning Glass Works, Corning, N.Y., a corporation of New York
Filed May 31, 1967, Ser. No. 642,419
Int. Cl. G03b 41/00
U.S. Cl. 250—65          11 Claims

ABSTRACT OF THE DISCLOSURE

An apparatus is disclosed which produces an image contrast inversion such as that which occurs in a negative to positive printing process. Light which passes through a photographic negative impinges upon a photochromic glass plate and exposes an image therein. The plate is then transported to a position where the positive image exposed therein is viewed. Thereafter, the image may be erased from the photochromic glass plate in preparation for storage of a new image.

BACKGROUND OF THE INVENTION

The present invention utilizes the variable light transmission properties of photochromic glass. This type of glass has the property of becoming less transparent if irradiated with blue or ultraviolet light, remaining unaffected by green light and becoming more transparent if irradiated by infrared, red or orange light. The characteristics of such glass, as well as the production thereof, are described in U.S. Pat. No. 3,208,860, granted to W. H. Armistead and S. D. Stookey on Sept. 28, 1965.

In accordance with the present invention an original image carrier, such as a photographic negative, is transilluminated by a light beam, the wavelength of which is such that it changes the optical density of a photochromic glass plate which is positioned adjacent the photographic negative. Two different modes of operation are afforded by this device. One mode of operation provides a completely reversible negative to positive image printing that can be recycled many times. "Throw away" proofs are required in present photographic techniques to determine the quality of a photographic negative. Then enlargement is required to determine the final resolution and focus of the negative. This invention accomplishes these two steps by making a contact exposure on a photochromic glass plate and enlarging the image by optics during the viewing phase. The apparatus of this invention requires much less time than photographic processing methods due to the elimination of the chemical development phase, and the cost is less due to the elimination of chemicals and paper involved in making a photographic proof.

The second mode of operation relates to the transfer of a duplicate image from a primary image carrier to the photochromic glass plate. Thus, if the photographic negative is used as the primary image carrier, a negative image will also appear on the photochromic glass plate. After an image has been exposed in the photochromic glass plate, it can be used in a slide projector.

SUMMARY OF THE INVENTION

An object of this invention is to provide a completely reversible negative to positive image printing process that can be recycled many times.

Another object of this invention is to provide an apparatus which creates a positive image from a photographic negative without the necessity of costly developing chemicals and photographic paper.

A further object of this invention is to provide an apparatus for creating either a positive or a negative image from a primary image carrier.

Still another object of this invention is to provide an apparatus which produces an image contrast inversion such as a negative to positive printing operation and which is capable of magnifying the image many times.

Briefly, the image storage and display apparatus of this invention comprises a photochromic glass plate and means for supporting it in a plurality of discrete stations. A primary image carrier is supported adjacent the photochromic glass at the first of the plurality of discrete stations. The primary image carrier is transilluminated with light, the wavelength of which is such that an image corresponding to that in the primary image carrier is exposed in the photochromic glass plate. Means is provided for transporting the photochromic glass plate to a second of the plurality of discrete stations where means is provided for illuminating the plate with light, the wavelength of which is such that the image exposed in the photochromic glass plate is visible but the optical density of the photochromic glass is not changed thereby.

Other objects, features and advantages of this invention will become apparent during the course of the following detailed description and the attached drawings, on which, by way of example, only the preferred embodiments of this invention are illustrated.

DETAILED DESCRIPTION

Figure 1:
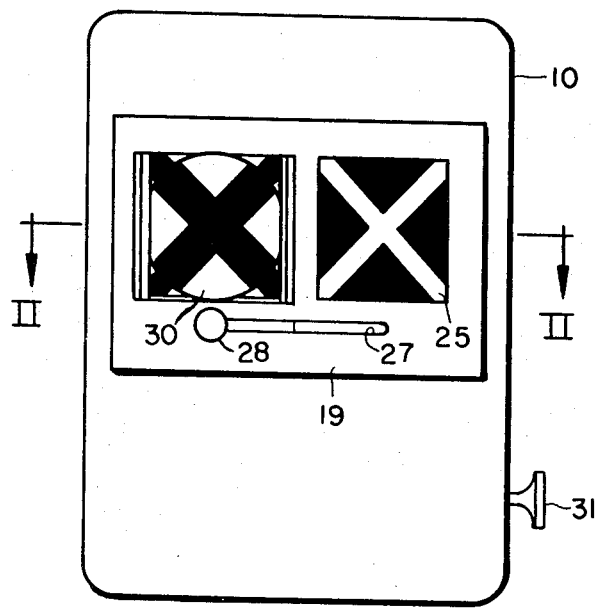
FIG. 1 is a front elevational view of a preferred embodiment of this invention, the photochromic glass plate being located in the viewing position.
Figure 2:
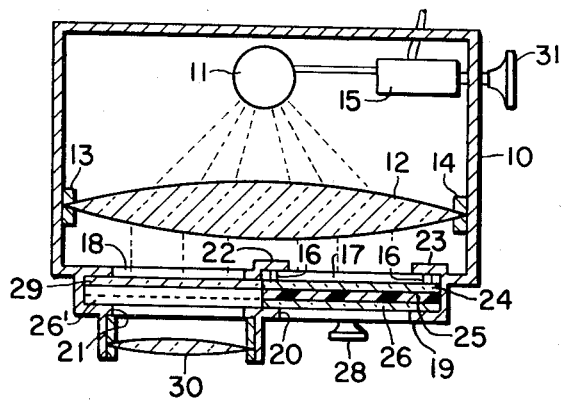
FIG. 2 is a cross-sectional view taken along lines II—II of FIG. 1, with the exception that the photochromic glass plate is shown in the activating or exposing position.

Referring to the embodiments shown in FIGS. 1 and 2, there is shown a housing 10 in which a light source 11 is situated. This light source can be of nearly any light producing type, the wavelength of which is in the visible, near ultraviolet and near infrared spectra. Short arc discharge lamps and a variety of incandescent lamps have been successfully used. Also, luminescent gas fills, such as argon, xenon or xenon-mercury can be used since their emission is in the required spectrum. Moreover, ordinary photo flash bulbs can also be used to provide a low cost, portable source. An intensity control 15 such as a rheostat, variable transformer or the like may be connected in series with the light source power supply to vary the intensity of the light radiated by the source 11. A knob 31 is located on the side of the housing 10 for adjusting the intensity control 15.

Figure 4:
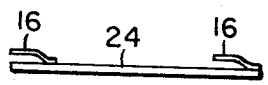
FIG. 4 is a side view of the exposing filter.

Light from the source 11 is focused into a collimated beam by a lens 12 which is supported within the cabinet 10 by a pair of supports 13 and 14. A pair of windows 17 and 18 are located in the front of the cabinet 10 to permit the collimated beam to pass therethrough. The lens 12 may have a circular or rectangular periphery or may be replaced by two smaller lenses which individually form collimated beams which pass through the windows 17 and 18. A transport mechanism 19, which is located on the front of the cabinet 10, has a pair of windows 20 and 21 which are aligned with the windows 17 and 18 respectively. Supported in the transport mechanism 19 adjacent the window 17 are an activation filter 24, a photographic negative 25 and a photochromic glass plate 26. Four leaf springs 16, which are secured to the filter 24 (see FIG. 4), bear against flanges 22 and 23 so that the negative 25 is flatly sandwiched between the photochromic glass plate 26 and the filter 24. The manually operated contact printing apparatus disclosed could be replaced by a mechanically operated pressure foot or a vacuum pull-down apparatus if automatic operation is desired.

A slot 27 located near the bottom of the transport mechanism 19 provides a path for the handle 28 which is attached to the photochromic glass plate 26. The portion of the transport mechanism 19 adjacent the window 18 is adapted to support a filter 29 which may be either a retrieval filter or an erasing filter. If enlargement of the image is desired, a lens 30 may be supported in front of the window 21. This lens is intended to be illustrative of either a single magnifying lens or an optical projection system for projecting an enlarged image.

The retrieval filter passes only green light, whereas the wavelengths of light passed by the storage and the erasing filters depends on the particular mode of operation. For operation in a negative-to-positive printing mode the storage or activation filter 24 passes only ultraviolet light, while the erasing filter 29 passes only infrared, red and orange light. The operation of the device in the latter mentioned mode is as follows. The handle 28 is moved to the right side of the slot 27 thereby positioning the photochromic glass 26 adjacent the activation filter 24. The photographic negative 25 is inserted between the filter 24 and the photochromic glass as shown in FIG. 2. Contact printing, wherein the negative is held firmly against the photochromic glass by the action of the leaf springs 16 bearing against the flanges 22 and 23, is not necessary if a well collimated beam is used. However, the losses through the lens 12 substantially equal the resolution losses incurred during contact printing with a pseudo collimated light beam. There is, therefore, no distinct advantage for either system. The intensity of light supplied by the source 11 is adjusted by the intensity control 15 to obtain an activation in the range wherein activation varies linearly with glass irradiation. After a sufficient time has elapsed, a positive of the image stored in the photographic negative is impressed on the photochromic glass. The handle 28 is then moved to the position shown in FIG. 1, bringing the photochromic glass plate to the position marked 26' adjacent the window 21, and the green retrieval filter is inserted in the position represented by the numeral 29. For direct viewing, the intensity control 15 is adjusted to provide a lower intensity light than is required for activation of the photochromic glass. Alternatively, the intensity of the source 11 may be increased and an enlarged image may be projected by the lens system 30. After the positive image has been inspected, the information contained in the photochromic glass can be erased by substituting an erasing filter for the retrieval filter. Since the amount of energy required for bleaching is about four to ten times the activation energy for most photochromic glasses, the intensity of the source 11 must be increased during the bleaching or erasing process. After a sufficient time has elapsed for the red light which passes through the erasing filter to completely bleach the photochromic glass, the handle 28 is again moved to the position shown in FIG. 2, and another photographic negative can be inserted, and the entire process can be repeated.

The alternative mode of operation, whereby the duplicate image of that stored on the photographic negative is impressed on the photochromic glass, is accomplished by reversing the positions of the activation and bleaching filters. Thus, red light passing through the photographic negative bleaches a duplicate image in the photochromic glass. When it is desired to erase such an image, the photochromic glass is exposed to ultraviolet light which darkens the entire photochromic glass plate.

Figure 3:
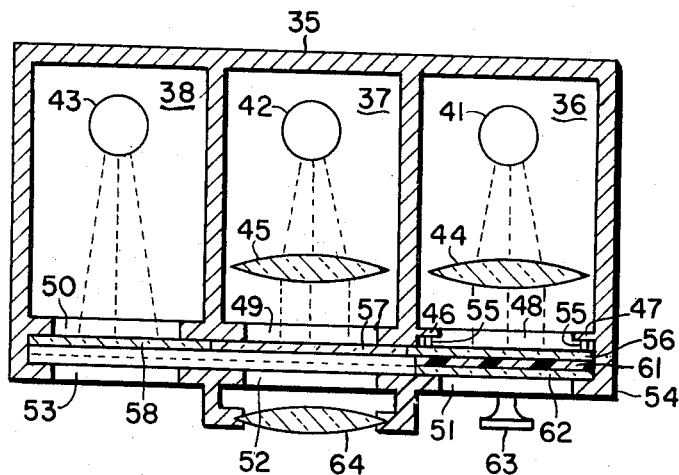
FIG. 3 shows a modification of the invention in which three separate chambers are used for exposure, reading and erasing.

In the embodiment shown in FIG. 3 a cabinet 35 has three separate compartments 36, 37 and 38 which are used for activation, viewing and bleaching respectively. Light sources 41, 42 and 43 may be selected to radiate primarily in the ultraviolet, green and red regions, respectively, or broad spectrum sources can be used. Regardless of the type of light sources utilized, filters 56, 57 and 58, which permit the passage of ultraviolet, green and red light, respectively, are required to eliminate undesired radiation. Examples of narrow spectrum luminescent light sources are neon, which radiates primarily in the infrared, red and orange regions of the spectrum, and mercury flash sources which radiate primarily in the ultraviolet region.

Windows 48, 49 and 50 are located in the front of the chambers 36, 37 and 38, respectively. Windows 51, 52 and 53 are located in the front of a mechanical transport mechanism 54 and are aligned with the windows 48, 49 and 50, respectively. Lenses 44 and 45 may be located in the chambers 36 and 37, respectively, if collimated light beams are desired. Adjacent the filter 56 is shown the photochromic glass plate 62, the position of which is controlled by the handle 63. The photographic negative 61 is shown between the filter 56 and the photochromic glass. Leaf springs 55, which are attached to the filter 56, bear against the flanges 46 and 47 to flatly compress the negative 61 between the photochromic glass plate 62 and the filter 56. A lens 64 is intended to be illustrative of either a single magnifying lens or an optical projection system for projecting an enlarged image.

The operation of the device shown in FIG. 3 is similar to that of FIGS. 1 and 2. When the handle 63 is moved to the position shown in FIG. 3, the photochromic glass is brought in front of the activation or storage chamber 36. The negative 61 is then inserted between the filter 56 and the photochromic glass plate, and the negative is held firmly against the photochromic glass plate by the action of the leaf springs 55 bearing against the flanges 46 and 47. After sufficient activation time has elapsed, the glass is transported to the viewing chamber 37. The glass plate is then moved to the erasing chamber 38 where the red light from the source 43 bleaches the glass clear.

The embodiment shown in FIG. 3 has the advantage that the retrieval and erasing filters do not have to be interchanged. The intensity of each of the light sources 41, 42 and 43 may be permanently adjusted to an optimum value, thereby eliminating the need for an intensity control.

What is claimed is:

1. An image storage and display apparatus comprising a photochromic glass plate,
   means for supporting said photochromic glass plate in a plurality of discrete stations,
   means for supporting a primary image carrier at a first of said plurality of discrete stations,
   a light source, the wavelength of which extends throughout the near infrared, visible and near ultraviolet spectra,
   a first filter located at said first station, the characteristics of said first filter being such that the light from said source which passes therethrough exposes on said photochromic glass plate an image corresponding to that on said primary image carrier,
   a second filter located at a second of said plurality of discrete stations, the characteristics of said second filter being such that the light from said source which passes therethrough illuminates the image exposed in said photochromic glass plate, but the optical density of said photochromic glass plate is not substantially changed thereby, and
   means for transporting said photochromic glass plate to any one of said plurality of discrete stations.

2. An apparatus as defined in claim 1 which further includes means to vary the intensity of said light.

3. An apparatus as defined in claim 1 which further includes means to collimate the light beam produced by said light source.

4. An apparatus as defined in claim 1 which further includes means located at said second station for magnifying the image appearing in said photochromic glass plate.

5. An apparatus as defined in claim 1 wherein said means for supporting a primary image carrier includes means for maintaining said primary image carrier in a planar disposition.

6. An image storage and display apparatus comprising
a housing having first and second windows in one side thereof,
a transport mechanism having third and fourth windows therein which are aligned with said first and second windows, respectively,
a photochromic glass plate in said transport mechanism,
means affixed to said photochromic plate to transport the same to a position adjacent either said third or said fourth window,
a source of light in said housing, the radiation from which extends throughout the infrared, visible and ultraviolet spectra,
filter means located adjacent said first window for passing only light having a wavelength which is such that it increases the density of said photochromic glass plate, and
means adjacent said second window for passing either light which bleaches said photochromic glass plate or a spectrum of visible light which does not affect the optical density of said photochromic glass plate.

7. An apparatus as defined in claim 6 which further includes means for supporting a primary image carrier, and means for maintaining said primary image carrier in a planar disposition.

8. An apparatus as defined in claim 7 which further includes means to vary the intensity of said light source.

9. An apparatus as defined in claim 8 which further includes means to collimate the light beam produced by said light source.

10. An apparatus as defined in claim 9 which further includes means adjacent said fourth window for magnifying the image appearing in said photochromic glass plate.

11. An apparatus as defined in claim 6 wherein said last mentioned means comprises a support device which is adapted to receive, at different times, a filter which passes green light and a filter which passes ultraviolet light.

References Cited
UNITED STATES PATENTS

| | | | |
|---|---|---|---|
| 2,482,813 | 9/1949 | Urbach | 250—65 |
| 3,208,860 | 9/1965 | Armistead et al. | 350—160 |
| 3,355,588 | 11/1967 | Acloque. | |
| 3,405,268 | 10/1968 | Brunton | 250—43.5 X |
| 3,431,048 | 3/1969 | Ludovici et al. | 353—29 |

OTHER REFERENCES

IBM Technical Disclosure Bulletin, vol. 8, No. 2, 1965, p. 278.

American Journal of Optometry and Archives, vol. 44, No. 6, June 1967, Smith, pp. 350–364.

WALTER STOLWEIN, Primary Examiner

A. L. BIRCH, Assistant Examiner

U.S. Cl. X.R.
350—160; 353—29; 355—71